United States Patent [19]

Rieman

[11] Patent Number: 4,536,622
[45] Date of Patent: Aug. 20, 1985

[54] REMOTE TELEPHONE ON-HOOK, OFF-HOOK CONTROL AND INDICATION CIRCUIT

[75] Inventor: Richard F. Rieman, Lawrence Township, Marion County, Ind.

[73] Assignee: AT&T Technologies, Inc., Berkeley Heights, N.J.

[21] Appl. No.: 426,359

[22] Filed: Sep. 29, 1982

[51] Int. Cl.³ .......................... H01H 9/22; H04M 1/03
[52] U.S. Cl. ..................................... 179/103; 179/167; 200/328
[58] Field of Search ........... 179/167, 159, 161, 158 R, 179/100 D, 100 R, 103, 84 L; 200/328

[56] References Cited

U.S. PATENT DOCUMENTS

| | | | |
|---|---|---|---|
| 2,863,959 | 12/1958 | Lampe et al. | 200/328 X |
| 3,396,244 | 8/1968 | Kowaleski | 179/100 R |
| 3,426,160 | 2/1969 | Ring | 179/100 D |
| 3,459,900 | 8/1969 | Alster et al. | 179/84 L |
| 3,489,860 | 1/1970 | Greenman et al. | 179/81 C |
| 3,500,293 | 3/1970 | Cocco | 339/113 |
| 3,896,270 | 7/1975 | Kopec et al. | 179/84 L |
| 4,124,785 | 11/1978 | Seretny et al. | 179/103 |
| 4,131,768 | 12/1978 | Wood | 179/178 |
| 4,379,953 | 4/1983 | Huff | 179/178 |

FOREIGN PATENT DOCUMENTS 1467100 12/1966 France ................................. 200/328

*Primary Examiner*—Thomas W. Brown
*Attorney, Agent, or Firm*—R. F. Kip, Jr.

[57] ABSTRACT

A telephone handset arranged to operate completely independently of a base comprises switches for effecting a connection with a telephone line and a manually operable pushbutton for operating the switches. The pushbutton is biased to hold the switches in a first position to place the telephone handset OFF-HOOK. Successive manual operations of the pushbutton places the switches in a second position wherein the telephone handset is ON-HOOK. The pushbutton also includes a lip for latching the switches in the second condition to hold the telephone handset ON-HOOK. A neon bulb is located in the handset to signal when ringing appears on the telephone line.

1 Claim, 3 Drawing Figures

REMOTE TELEPHONE ON-HOOK, OFF-HOOK CONTROL AND INDICATION CIRCUIT

TECHNICAL FIELD

This invention relates to telephone station circuits and more particularly to a circuit for effecting ON-HOOK, OFF-HOOK control and ringing indication in a telephone handset.

BACKGROUND OF THE INVENTION

Many modern telephone sets have the dial located in the handset with the transmitter and receiver, instead of located in the permanently positioned base, thereby giving the telephone user greater mobility while using the telephone set. One such telephone set is the Trimline ® Telephone Set manufactured by the Western Electric Co., Inc. of New York, N.Y.

Since the dial is located in the handset, only the length of the handset cord limits the dialing convenience of a telephone user. Also included in the telephone handset is a push-button switch which when depressed opens the tip and ring lead connection between the telephone handset and the user's telephone line, thereby terminating the present connection. Release of the button switch reconnects the tip and ring leads of the telephone handset with the user's telephone line, thereby establishing a second connection to receive dial tone. Thus the pushbutton switch located in the handset and electrically connected in series with the base mounted switch hook affords the user greater mobility since not only can the user dial by using the handset dial, but a first connection can be terminated and a second dial tone connection established by depressing and releasing the pushbutton switch located on the handset.

A fully mobile telephone set, that is one which can be operated independent of a base, is useful in a hospital environment where a patient can keep the telephone set on the bed and not need to return it to the permanently mounted base. In this environment it is necessary that the telephone set be able to operate in three modes, ON-HOOK, OFF-HOOK and temporary ON-HOOK. In conventional practice when a telephone set is considered ON-HOOK the set's receiver, transmitter and dial circuitry are disconnected from the telephone line with only the ringer circuit closed, and when "ON-HOOK" it is connected to the telephone line. Temporary ON-HOOK permits the user to easily break an existing connection, e.g., terminate an existing call, and establish a second connection, e.g., establish a new dial tone connection. Further, the telephone set must have a ringing indication to signal the user of an incoming call.

To achieve a partially mobile telephone handset, the handset has been made somewhat independent of the switch-hook typically positioned in the permanently positioned base by locating a switch-hook arrangement in the handset as described in the patent of C. Kowaleski, U.S. Pat. No. 3,396,244 issued on Aug. 6, 1968. This arrangement features a double-acting mechanical push-button type switch which operates to retain the set in either an ON-HOOK or OFF-HOOK mode without having to return the set to its base mounted cradle. Although the switch arrangement described in the Kowaleski patent does permit the handset to be operated in either an ON-HOOK or OFF-HOOK mode independent of the base, the mechanical switch used in Kowaleski has elaborate mechanical linkages and adds considerable expense to the cost of manufacturing the handset.

Another approach to increasing utility and mobility of the dial-in-handset telephone is adding a logic and control circuit to the handset for effecting ON-HOOK and OFF-HOOK operations as described by Greeman et al. in their U.S. Pat. No. 3,489,860 issued Jan. 13, 1970. However, these additional electronics add to the cost and the circuit complexity of the telephone set.

There is a need, therefore, for a dial-in-handset telephone having complete flexibility independent of a base that is easy to operate, economical to manufacture and containing no new complex circuitry.

SUMMARY OF THE INVENTION

The foregoing problems are solved by the present invention in which a telephone handset is interconnected with a telephone line and includes switching means for effecting the telephone line connection. The switching means is arranged to operate in a first position for opening the telephone line connection and placing the telephone handset in an ON-HOOK condition and in a second position for closing the connection and placing the telephone handset in an OFF-HOOK condition. The handset further comprises a manually operable push-button which is biased to extend through an opening in the telephone handset and to hold the switching means in the second position. When manually operated, the pushbutton either temporarily places the switch means in the first position (ON-HOOK) or holds the switch means in the first position. Successive manual operations of the pushbutton transfer the switch means from the first position (ON-HOOK) to the second position (OFF-HOOK).

The telephone handset also includes indication means responsive to ringing signals appearing on the telephone line.

In an embodiment of the invention, the pushbutton is biased by a spring to hold the switching means in the second position. The pushbutton comprises a lip which, when the pushbutton is depressed and moved in a transverse direction toward the location of the lip on the pushbutton, the lip catches on the lower edge of the opening through which the pushbutton extends to hold the switching means in the first position.

BRIEF DESCRIPTION OF THE DRAWINGS

Other features and advantages of the invention, its organization, construction, and operation will be best understood from the following detailed description of a specific embodiment thereof, taken in conjunction with the accompanying drawings in which.

DETAILED DESCRIPTION

Figure 1:
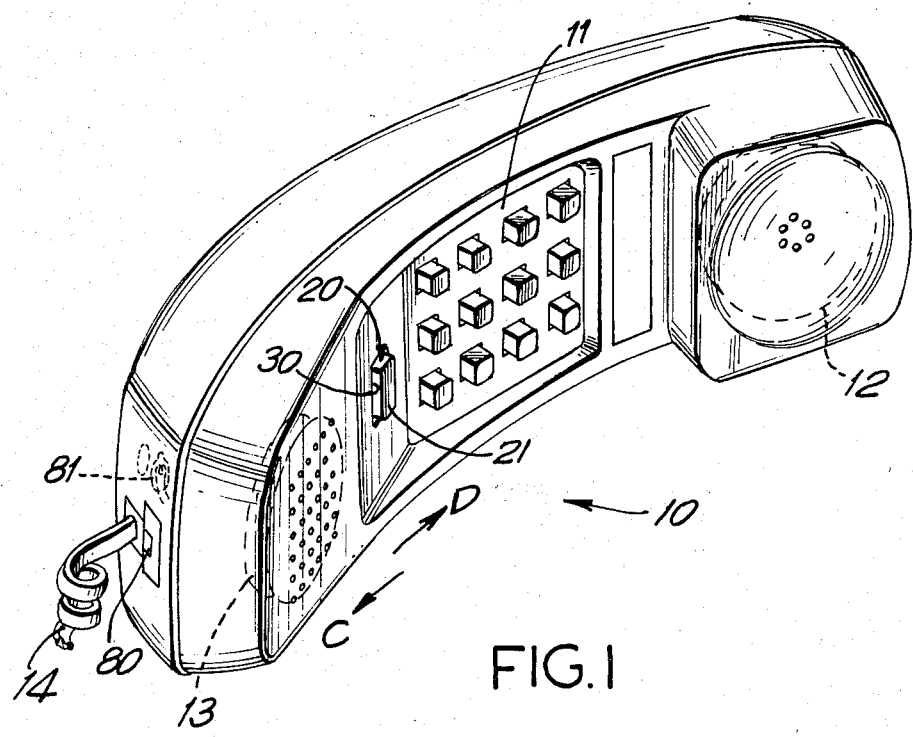
FIG. 1 is a perspective view of a telephone handset.

Referring now to FIG. 1 there is seen a dial-in-handset telephone set 10 having a dial 11, a receiver 12 and a transmitter 13 all interconnected with a telephone line comprising TIP and RING leads located in cable 14.

Also positioned in telephone set 10 is pushbutton switch 20, which when fully depressed, operates to open the TIP and RING leads extending from telephone 10 to disconnect telephone set 10 from the telephone line.

Figure 2:
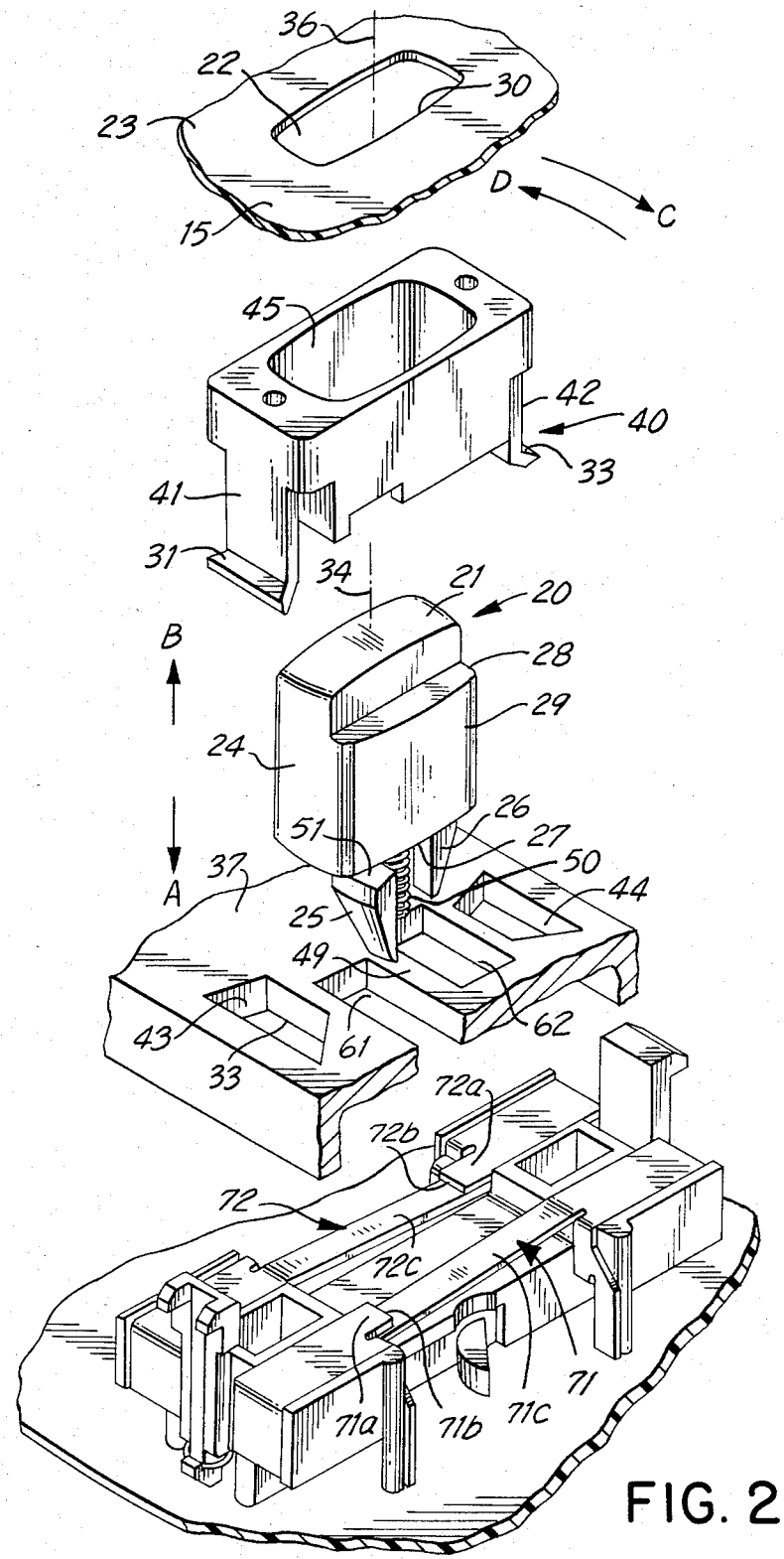
FIG. 2 is an exploded view of a pushbutton switch as it is assembled within the telephone handset.

FIG. 2 is an exploded view of the operation of pushbutton switch 20 within telephone set 10. The upper surface 21 of switch 20 protrude through an opening 22 located in the front enclosure wall 15 of the telephone set housing 23. Switch 20, having a rectangular-shaped body 24, has two spike-shaped legs 25, 26 extending in a downward direction from the lower edge 27 of body 24. A lip, or latch, 28 extends perpendicularly from lower portion 29 of body 24 in a direction toward the transmitter 13 end of handset 10 and is arranged to catch onto a lower surface of edge 30 of opening 22 when pushbutton switch 20 is moved toward transmitter 13 and lip 28 is positioned directly beneath edge 30 so as to prevent pushbutton 20 from fully protruding through opening 22.

Opening 22 in telephone set housing 23 is rectangular in shape to allow the upper surface 21 of rectangular shaped pushbutton 20 to extend through the opening. Opening 22 and pushbutton 20 can be any shape desired which can be easily operated by the telephone user. The dimensions of opening 22 are such to permit both the upper surface 21 and lip 28 to extend through opening 22 when both are aligned directly beneath opening 22.

A frame 40 is affixed to housing 23 by clips 41, 42 which fit into slots 43, 44 formed in a chassis 37 located in, and in fixed relation with, the housing. Clips 41 and 42 have respective flat tabs 31, 32 which, when the clips are inserted into slots 43, 44 are adapted by upward translational movement of the frame and clips to be brought into flush engagement with the side 33 of chassis 37 which is away from the frame 40. Frame 40 includes an inner guide portion 45 for slidably mounting the body of pushbutton switch 20. An abutment 49 located in housing 23 on chassis 37 beneath switch 20 supports a helical spring 50 that biases switch 20 to an upward position when switch 20 is slidably mounted in guide portion 45 of frame 40.

Legs 25, 26 extending downward from body 24 of switch 20 each has a stop located thereon which comes into contact with the lower edge of the frame 40 to prevent spring 50 from pushing switch 20 completely out of the frame 40. The stop for leg 25 is identified in FIG. 2 by the reference numeral 51, and the stop (not shown) for leg 26 is similar in shape to the stop 51 and is positioned in the horizontal plane to be diametrically symmetrical with stop 51 with respect to the axis 34 of pushbutton 20. Clips 41, 42 are not locked into slots 43, 44 of housing 23 such that frame 40 is frozen into a permanent position within housing 23, but are rather affixed such that frame 40 can rock back and forth within housing 23 when a force is applied to pushbutton 20 in the direction of arrow C or D of FIG. 2, the directions in which arrows C and D point in FIG. 2 being, respectively, towards and away from transmitter 13 (FIG. 1). The action of biasing spring 50 allows this rocking movement to take place in that when pushbutton switch 20 is slidably assembled within frame 40 in housing 23 with biasing spring 50 positioned as seen in FIG. 2, clips 41, 42 are dimensioned to allow spring 50, which exerts an upward force against the body 24 of pushbutton 20, to force the stops, of legs 25, 26 into contact with and move frame 40 slightly away from the back side of housing 23 so as to bring tabs 31, into flush engagement with the back side 33 of chassis 37 and thereby stabilize the frame 40 to maintain button 20 in an angular reference position at which it is in centered relation with aperture 22, and the axis 36 of such aperture is parallel to the axis 34 of the button. At the same time, the maintaining in this manner of button 20 at such angular reference position under the urging of spring 50 is a yieldable maintaining in that it is adapted to permit frame 40 and mounted pushbutton 20 to be rocked in direction of arrow C in FIG. 1 and FIG. 2 when a force is applied to surface 21 of pushbutton 20 in the direction of arrow C. With frame 40 continuing to be pushed translationally outward as far as it can be driven by the urging of spring 50, the rocking of frame 40 in the direction of arrow C will cause tabs 31, 32 to lift off of back side 33 of chassis 37 except for the left (FIG. 2) ends of the tabs which remain in contact with such side. Such lifting-off action of the tabs together with the urging of spring 50 will cause the angular movement of frame 40 in the direction of arrow C to be against the bias of a resilient force tending to restore the frame 40 and button 20 to reference angular position. Once the frame and button have been angularly moved away from that position to a displaced angular position at which button axis 34 makes an acute angle with aperture axis 36, and in which the frame and button are frictionally held as later described, that frictional holding can be overcome by applying manual force in the direction of arrow D to the end of returning the frame and button to reference angular position. If no force is applied to surface 21 in the direction of arrows D or D, pushbutton 20, which is biased by the action of spring 50, moves only in self-parallel translational movement (i.e., as contrasted with rotational or angular movement) in direction A or B within frame 40. Additionally, spike-shaped legs 25, 26 are designed to facilitate the motion of frame 40 and pushbutton 20.

Located directly beneath the tips of spike-shaped legs 25, 26 on opposite sides of abutment 49 are two slots 61, 62 such that as pushbutton 20 is pushed downward against spring 50 in the direction of arrow A in FIG. 2, the tips of each leg pass through slots 61, 62.

Figure 3:
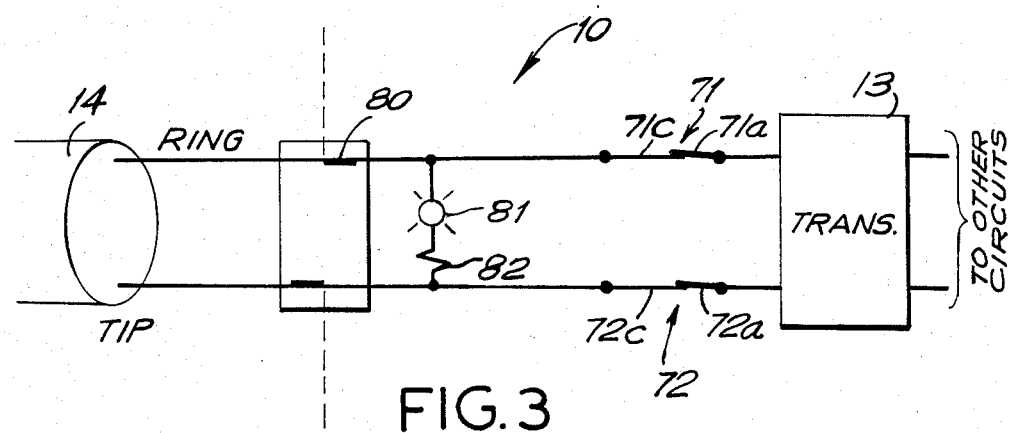
FIG. 3 is an electrical circuit of the TIP and RING lead connections within the telephone handset.

The TIP and RING leads in cable 14 which connect telephone set 10 with the telephone subscriber's line are electrically connected within telephone set 10 to two spring arm switches 71 and 72 as seen in FIG. 3. Spring arm switch 71 comprises a contact 71a fixed in a permanent position and a contact 71b carried on the end of a spring arm 71c so that, when that spring arm is pushed in a downward direction, contact 71b moves away from fixed contact 71a to break the electrical connection between the two contacts. Similarly, spring contact 72 comprises a fixed contact 72a and a movable contact 72b carried on the end of a spring arm 72c so that downward pushing of arm 72 results in a breaking of electrical connection betweenn contacts 72a and 72b. Spring arms 71c, 72c are positioned directly beneath slots 61, 62 and tips of legs 25, 26, respectively, as seen in FIG. 2. When pushbutton switch 20 is depressed against bias spring 50 in direction of arrow A in FIG. 2, switch 20 slides in a downward direction in guide 45 such that the tips of legs 25, 26 pass through slots 61, 62, come into contact with spring arms 71c, 72c, and push the arms downward to physically break the electrical connection between the two sets of contacts 71a–71b and 72a–72b, thereby opening the TIP and RING lead connections within the telephone set 10.

FIG. 3 shows a portion of the electrical circuitry of telephone set 10. The TIP and RING leads, located in cable 14, are connected through plug 80 mounted in housing 23 of telephone set 10 with a neon bulb 81 and a resistance 82 interconnected in parallel between the leads, and then connected to the remaining circuitry (e.g., transmitter 13, receiver 12 and dial 11) of telephone set 10 through normally closed spring switches 71, 72. Thus when switch points 71, 72 are closed, telephone set 10 is connected to the TIP and RING leads and is in an OFF-HOOK condition. When switch points 71, 72 are open, TIP and RING lead connections within telephone set 10 are opened and telephone set 10 is considered to be ON-HOOK with only the neon bulb 81 and resistance 82 connected across the TIP and RING leads. Bulb 81 extends through a hole (not shown) on the back side of housing 24, which backside is opposite from the front side or face having dial 11 located on it, such that when telephone set 10 is lying face down bulb 81 can be seen by a user.

The operation of telephone set 10 will now be explained in detail. With pushbutton 20 fully extended in an upward direction (arrow B, FIG. 2) in guide frame 40 such that stop 51 is in contact with the lower edge of frame 40, legs 25 and 26 are not inserted into slots 61, 62 and switches 71 and 72 are closed, thereby connecting the TIP and RING leads with the transmitter-receiver dial circuitry of telephone set 10. In this condition, telephone set 10 is considered to be OFF-HOOK with upper surface 21 and lip 28 extended through opening 22 to indicate that telephone set 10 is in the OFF-HOOK mode.

To place telephone set 10 in a temporary ON-HOOK condition, the telephone user need only to depress pushbutton switch 20 by pushing the upper surface 21 of switch 20 which extends through opening 22 down into set 10 in the direction of arrow A of FIG. 2 with a force sufficient to overcome the upward biasing force exerted by spring 50. As switch 20 is depressed and moves down guide 45 in the direction of arrow A of FIG. 2, the tips of legs 25 and 26 initially come into contact with spring arm switches 71 and 72 respectively and push arms 71c and 72c downward to physically break the electrical contact between sets of contacts 71a–71b and 72a–72b. With button switch 20 depressed, TIP and RING leads are disconnected from telephone set 10 at switch points 71, 72 of FIG. 3 and set 10 is considered ON-HOOK. When the telephone user stops pushing upper surface 21 of pushbutton switch 20, the biasing action of spring 50, which is exerting a force in an upward direction, now moves pushbutton 20 upward in the direction of arrow B until the stops on legs 25, 26 come into contact with frame 40 to prevent further upward movement of pushbutton switch 20 and which now places telephone set 10 in an OFF-HOOK condition. Lip 28 does not prevent pushbutton 20 from extending through opening 22 since opening 22 is sufficiently large to allow surface 21 and lip 28 to move through the opening unimpeded. Additionally, pushbutton 20 is slidably mounted in frame 40 which positions surface 21 in direct alignment with opening 22 as seen in FIG. 2.

To place telephone set 10 in a permanent ON-HOOK mode, the user depresses pushbutton 20 in the same manner as putting the set in a temporary ON-HOOK mode. With pushbutton switch 20 depressed a force is applied to upper surface 21 of pushbutton 20 in the direction of arrow C, FIG. 2, that is a force pushing pushbutton 20 toward transmitter 13. Pushbutton 20 is arranged to rock back and forth in frame 40. The sidewise manual translational force exerted on the upper surface 21 in the direction of arrow C is applied to angularly move button 20 from its reference angular position to the mentioned displaced angular position at which the button is offset from centered relation with aperture 22, and at which the lip 28 is brought directly beneath an inner surface position (not shown) of wall 15 constituting as edge 30 of aperture 22. The applied force depressing pushbutton 20 is then released and biasing spring 50 pushes pushbutton 20 upward and toward transmitter 13 until lip 28 catches, or latches, onto the edge 30 of opening 22 and prevents pushbutton 20 from continuing its upward movement. The upward force imparted by biasing spring 50 is not sufficient to overcome the friction between lip 28 and edge 30 so as to release lip 28 from edge 30 and in this position, legs 26, 27 of pushbutton 20 are sufficiently depressed to keep contacts 72a, 72b and 71a, 71b apart such that the TIP and RING leads are not connected to telephone set 10, thereby placing telephone set 10 in an ON-HOOK mode.

To disengage lip 28 from edge 30, a slight force is applied to the upper surface 21 of pushbutton 20 in the direction of arrow D of FIG. 2, that is a force applied toward receiver 12, will move pushbutton 20 in that direction such that lip 28 slips from beneath edge 30 and biasing spring 50 now moves pushbutton upward until pushbutton 20 is fully extended. In this position, switches 71 and 72 are closed and telephone set 10 is returned to an OFF-HOOK mode as described above.

With telephone set 10 in an ON-HOOK mode, that is pushbutton 20 is fully depressed such that switches 71, 72 are open, ringing current sent out from the telephone central office over the subscriber's telephone line to the TIP and RING leads will cause lamp 81 to ignite during the time the ringing current is on the line, thereby giving a visual indication of ringing to the telephone user. A type of bulb which can be used as lamp 81 is manufactured by the Little Fuse Co. of Des Planes, Ill. and is coded 900-2-52 Neon Bulb. The value of resistance 82, which serves to protect lamp 80, is typically 56K ohms.

Pushbutton 20 also acts as an indicator to identify in which mode telephone set 10 is operating. When upper surface 21 is fully extended through opening 22, the telephone user knows that telephone set 10 is OFF-HOOK, fully depressed upper surface 21 is an indication of temporary ON-HOOK mode and partially depressed upper surface 21 with lip 28 engaged is an indication of held ON-HOOK mode. Surfaces 21 and 80 can be colored (e.g., red) to make it easier for the telephone user to determine in which position pushbutton 20 is situated.

Thus the present invention allows telephone set 10 to be used without any base mounted switch hook while permitting the user to place telephone set 10 in an OFF-HOOK mode, a temporary ON-HOOK mode, or an ON-HOOK mode by operation of pushbutton 20. Further, telephone set 10 is modified to give a visual indication of ringing.

It will also be apparent that one skilled in the art may make various modifications and changes to the apparatus disclosed herein without departing from the spirit and scope of this invention.

What is claimed is:

1. A telephone handset comprising: a handset housing containing a transmitter and a receiver and having a dial mounted on its front side on a front enclosure wall for said housing, said wall having formed therein an aperture communicating with the interior of said housing and having an aperture axis passing through said aperture transverse to said wall, a chassis disposed in said housing in fixed relation therewith so as to be beneath and spaced from said aperture, said chassis having formed therein a pair of slots, a frame disposed in said housing between said aperture and chassis and having formed therein a guideway extending in the direction of the aperture-chassis spacing, a pair of clips joined to said frame and extending from said frame through said slots, said clips terminating away from said frame in respective tabs facing toward the side of said chassis away from said frame and each adapted to make engagement with such side, and said clips being dimensioned and unlocked in said slots to allow said frame to be angularly rockable relative to said chassis and housing in the direction towards and away from said transmitter, a push button received in said aperture so that the front and back ends of said button are, respectively, outside and inside said housing, said button having a button axis extending between said ends and a body portion disposed intermediate said ends and received with a sliding fit in said guideway, and said button having formed in its front end and on a side thereof in the direction towards or away from said transmitter a recessed knee of "L" shape in cross-section in such direction so as to be bounded by first and second button surfaces substantially normal to each other, and of which said first surface extends inward from said side to form a lip on said button, and said second surface extends from the inner edge of said first surface in the axial direction of said button to the top of said button at its front end, a compression spring interposed between said chassis and a rearward part of said push button so as to urge said button outwardly, a stop formed on said button and adapted by engagement with said frame to communicate thereto such urging of said spring, said button and frame being adapted by manipulation of said button to be movable together between a reference angular position at which said button and aperture axes are parallel and said button is slidably movable in said frame between innerpost and outermost operating positions and, on the other hand, a displaced angular position at which said button and aperture axis are at an acute angle and said lip is beneath a portion of said wall adjacent said aperture, said spring being adapted when said button and frame are at such displaced angular position to displace such button translationally outward so as to bring said lip into friction contact with such wall portion and, thereafter and by such friction contact, to yieldably maintain said button and frame in said displaced angular position against the bias of a resilient force produced by said spring, said spring button and frame being further adapted, when said button and frame are at said reference angular position, to operate so that said frame and chips are driven outward by said urging to bring said tabs into said engagement with said chassis side to thereby stabilize said frame to yieldably maintain said button and frame at said reference angular position while permitting angular displacement of said button and frame away from such position against the bias of said resilient force produced by said spring; said handset further comprising, switch means disposed in said housing adjacent the back end of said button and adapted when, respectively, said button is in either of said innermost operating and displaced angular positions and, alternatively, said button is in said outermost operating position, to be actuated by said back end of said button to assume, respectively, a first open condition corresponding to an ON-HOOK condition for said handset, and a second close condition corresponding to an OFF-HOOK condition for said handset.

* * * * *